United States Patent [19]

Kubota

[11] Patent Number: 4,514,984
[45] Date of Patent: May 7, 1985

[54] RESERVOIR TANK STRUCTURE FOR MASTER CYLINDER

[75] Inventor: Hitoshi Kubota, Minami-ashigara, Japan

[73] Assignee: Nissan Motor Company, Limited, Kanagawa, Japan

[21] Appl. No.: 503,719

[22] Filed: Jun. 13, 1983

[30] Foreign Application Priority Data

Aug. 25, 1982 [JP] Japan .................. 57-129016[U]

[51] Int. Cl.³ .............................................. F15B 7/00
[52] U.S. Cl. ........................................ 60/585; 60/592; 220/373; 220/378
[58] Field of Search ............... 60/585, 592; 222/542; 277/12, 32, 68; 215/341; 220/304, 357, 369, 358, 373, 378

[56] References Cited

U.S. PATENT DOCUMENTS

| 4,198,824 | 4/1980 | Nogami et al. | 60/592 |
| 4,355,512 | 10/1982 | Kubota et al. | 60/585 |
| 4,393,655 | 7/1983 | Komorizono | 60/585 |

FOREIGN PATENT DOCUMENTS

| 54-121371 | 3/1978 | Japan | 60/585 |
| 56-31854 | 3/1981 | Japan | 60/585 |

Primary Examiner—Robert E. Garrett
Attorney, Agent, or Firm—Schwartz, Jeffery, Schwaab, Mack, Blumenthal & Koch

[57] ABSTRACT

In a reservoir tank which includes an oil seal mounted to the cap of the reservoir tank and adapted to be in resilient engagement against the inner peripheral surface of the reservorir tank, the oil seal is integrally formed with an annular projection the tip portion of which is positioned at the braking fluid side of the cylindrical portion of the cap.

4 Claims, 3 Drawing Figures

RESERVOIR TANK STRUCTURE FOR MASTER CYLINDER

BACKGROUND OF THE INVENTION

This invention relates to a reservoir tank structure for storing the brake fluid of a master cylinder, more specifically means for preventing brake fluid from dropping from or coming out of a disengaged and tilted cap of the reservoir tank onto the outer peripheral surface of the reservoir tank.

A conventional master cylinder reservoir tank structure as shown in FIG. 1 is known in the art, wherein a cup-type reservoir tank 1 is mounted on a master cylinder for a brake control system (not shown) with brake fluid 2 being stored within the reservoir tank 1. The reservoir tank has a rib 3 formed therein at the lower portion thereof, on the upper surface of which a hat-shaped filter 5 is placed having rib 4 formed therein. A cap 8 is screwed onto the upper outer periphery of the reservoir tank 1 to cover the upper portion of the reservoir tank. An oil seal case 9 is received within and mounted on the cap 8 and comprises a base 10 having a disk shape, a cylindrical oil seal receiving portion 11 formed along the outer periphery of the base 10, and a disk-shaped baffle portion 12 formed just below the base 10. Formed on the outer peripheral surface of the oil seal receiving portion 11 is an annular groove 13 in which an oil seal 14 is accommodated in resilient engagement against the inner peripheral surface of the reservoir tank 1.

The above described conventional master cylinder reservoir tank has the following drawbacks:

Jerking or vibrations of the automobile body during driving conditions may cause the brake fluid 2 to splash upwards.

The upwardly splashed brake fluid adheres to the base 10 and the baffle portion 12.

When the cap 8 is disengaged and tilted as shown in FIG. 2 so that the interior of the reservoir tank can be inspected, the brake fluid which adhered to the base 10 and the baffle portion 12 drops off and adheres to the female thread portion of the cap.

When the cap 8 is then mounted to the reservoir tank 1 again, the brake fluid which adhered to the female thereded portion of the cap 8 runs down along the outer peripheral surface of the reservoir tank 1, which may be confused as brake fluid directly leaking out from the tank 1.

SUMMARY OF THE INVENTION

A major object of the invention is therefore to provide a reservoir tank structure in which the cap of the reservoir tank can be disengaged and tilted with no brake oil dropping from the cap onto the outer peripheral surface of the reservoir tank.

Another object of the present invention is to provide a reservoir tank structure in which the confusion of brake oil leakage is not mistook for leaking brake oil which adhered to the outer peripheral surface of the reservoir tank.

In accordance with one embodiment of the present invention, a reservoir tank includes an oil seal which is mounted on the cap of the reservoir tank, adapted to be in resilient engagement against the inner peripheral surface of the reservoir tank and is integrally formed with an annular projection the tip portion of which is positioned near the brake-fluid-facing end surface of the cap, in other words, on the brake fluid side of the cylindrical portion of the cap.

The present invention is now described in greater detail with reference to the accompanying drawings illustrating an embodiment of this invention.

BRIEF DESCRIPTION OF THE DRAWING

The invention will be better understood from the following description taken in conjunction with the accompanying drawing, where in.

DESCRIPTION OF THE PREFFERED EMBODIMENT

Figure 1:
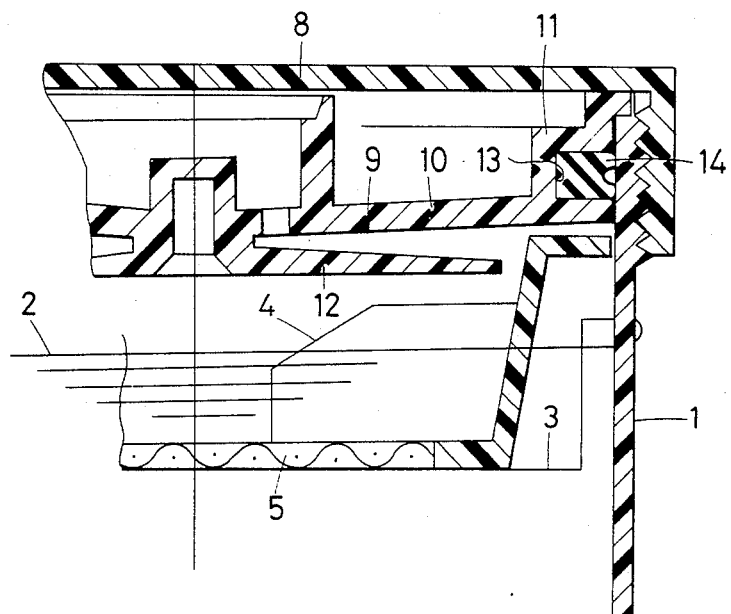
FIG. 1 is a cross sectional view illustrating a conventional automobile reservoir tank structure.
Figure 3:
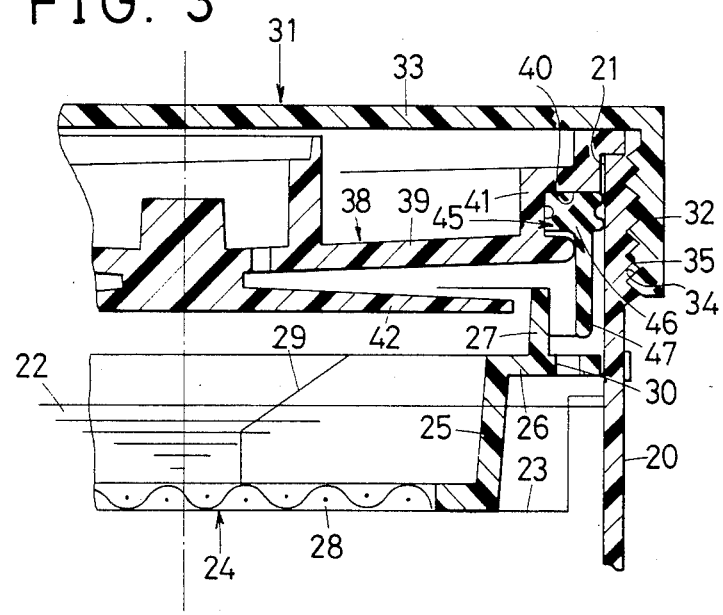
FIG. 3 is a cross sectional view illustrating an embodiment of the automobile reservoir tank structure according to the present invention.
Figure 2:
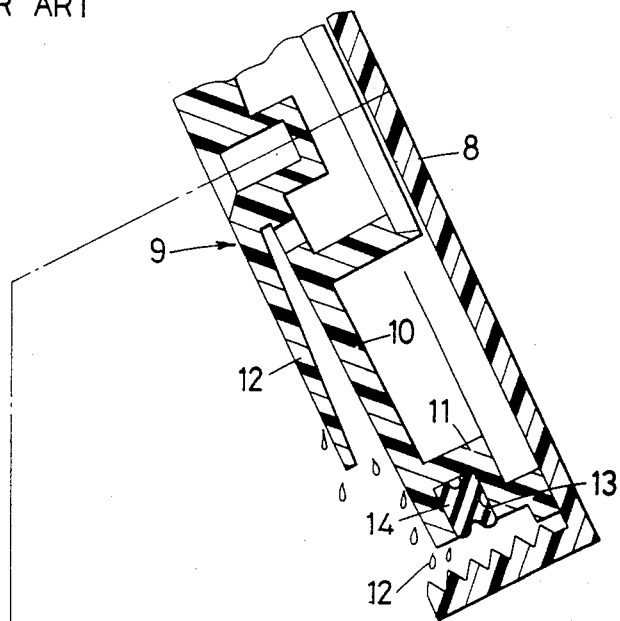
FIG. 2 is a cross sectional view illustrating a problem on the conventional automobile reservoir tank structure.
Figure 2:
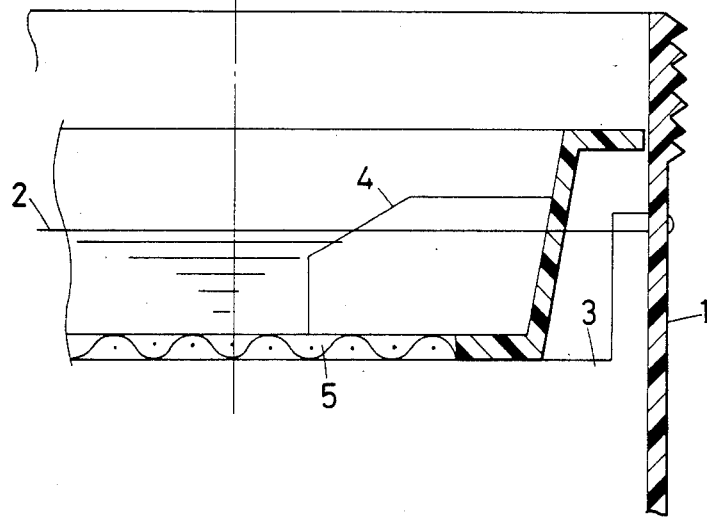

Illustrated in FIG. 3 is a reservoir tank structure in which a cup-type reservoir tank 20 having a fluid inlet port 21 at the upper portion thereof is mounted on a master cylinder (not shown) to store brake fluid 22 therein. Formed within and at the lower portion of the reservoir tank 20 is a rib 23 on the upper surface of which a filter 24 is placed. The filter 24 comprises a cylindrical portion 25, a flange portion 26 extending outwardly from the upper end of the cylindrical portion 25, an annular projection 27 extending upwardly from the upper surface of the flange 26, a mesh portion 28 closing the lower opening of the portion 25 for filtering brake fluid 22 which is stored in the reservoir tank 20, and a rib portion 29 for connecting the inner peripheral surface of the cylindrical portion 25 to the upper surface of the mesh portion 28. The flange 26 is provided with openings 30 outward of the projection 27. The cap 31 comprises a cylindrical portion 32 and a disk portion 33 which closes the upper opening of the cylindrical portion 32. The cylindrical portion 32 is formed with a female thread portion 34 along the inner peripheral surface thereof which is adapted to engage a male thread 35 formed on the upper portion of the outer peripheral surface of the reservoir tank 20, whereby the cap 31 covers the brake fluid inlet port 21 of the reservoir tank 20. Mounted on the lower surface of the disk portion 33 is an oil seal case 38 which comprises a disk-shaped base 39, a substantially cylindrical oil seal receiving portion 41 having an annular groove 40 which is substantially I-shaped in cross section along the outer peripheral surface thereof and is formed along the outer end of the base 39, and a baffle portion 42 having a disk shape and formed just below the base 39. An oil seal 45 comprises an annular base 46 having a H-shape in cross section and an annular projection 47 integrally formed on the lower surface of the base 46. The base 46 is mounted to the cap 31 with a portion thereof received in the groove 40 and with the outer peripheral surface thereof being in resilient engagement against the inner peripheral surface of the reservoir tank 20, whereby the fluid seal 45 serves to prevent the leakage of the brake oil 22 stored in the reservoir tank 20.

The lower tip portion of the projection 47 is positioned lower than the lowermost surfaces of the cylindrical portion 32, the base 39 and the baffle portion 42, whererin the tip portion of the projection 47 is placed on the brake fluid side of the portion 32 of the cap 31, in other words, near the brake-fluid-facing end surface of the cap 31, closer to the brake fluid 22 in the tank 20 than the brake-fluid-facing end surface of the cap 31. The upper end portion of the projection 27 is interposed between the baffle portion 42 and the projection 47 so as to prevent the brake fluid 22 substantially from adhering to the base 39 and the projection 47.

The operation of the embodiment of the present invention is as follows:

The brake fluid 22 adheres during the splashing thereof to the base 39, the baffle portion 42, and the projection 47. When the cap 31 is then disengaged and tilted so that the interior of the reservoir tank 20 can be inspected, brake oil which adhered to the base 39 and the baffle portion 42 drops off onto the inner peripheral surface of the projection 47 according to the direction that the cap is tilted, since the lower end of the projection 47 is positioned lower than the lowermost surfaces of the base 39 and the baffle 42 as shown in FIG. 3. In addition, the brake fluid which has dropped off onto the inner peripheral surface of the projection 47 and which has adhered to the jection 47 also drops off the lower end of the projection 47. Since the lower end of the projection 47 is positioned lower than the lowermost surface of the cylindrical portion 32 as shown in FIG. 3, the adhered brake fluid drops off the lower end of the projection 47 directly onto the ground below and not onto the female thread portion 34 of the tilted cap 31. Therefore, the cap 31 can then be engaged with the reservoir tank 20 without the adhesion of the adhered brake fluid onto the male thread portion 35 so that the adhered brake fluid would never run down along the outer peripheral surface of the reservoir tank 20.

According to the present invention set forth previously, the annular projection is integrally formed on the oil seal mounted on the cap of the reservoir tank in resilient engagement against the inner peripheral surface of the reservoir tank with the tip portion of the projection being positioned on the working fluid side of the cylindrical portion of the cap, in other words, near the working-fluid-facing end surface of the cap so that the working fluid can never run down along the outer peripheral surface of the reservoir tank, whereby the confusion on the leakage of the brake fluid from the reservoir tank can be prevented.

What is claimed is:

1. A reservoir tank structure for a master cylinder, comprising:
   a reservoir tank comprising an inlet port;
   a filter disposed within said reservoir tank, said filter comprising an annular projection which extends upwardly in the direction of said reservoir tank inlet port;
   a cap assembly disposed such that it covers said inlet port, and
   an oil seal disposed on said cap assembly in resilient engagement with the inner peripheral surface of the reservoir tank to form a seal therebetween, said oil seal being provided with a downwardly extending annular projection which is inserted between the inner peripheral surface of the reservoir tank and the upwardly extending annular projection of said filter.

2. A reservoir tank structure as recited in claim 1, wherein said cap assembly further comprises base and baffle portions disposed within said cap such that the lower surfaces of said base and baffle portions face toward the interior of the reservoir tank, and the distal end of the oil seal annular projection extends beyond the lower surfaces of the base and baffle portions of the cap.

3. A reservoir tank structure as recited in claim 1, wherein said filter further comprises a radially outwardly extending annular flange, and said flange comprises a plurality of openings therethrough and is disposed towards the interior of the reservoir tank, relative to the distal end of said oil seal annular projection.

4. A reservoir tank structure as recited in claim 2, wherein said filter further comprises a radially outwardly extending annular flange, and said flange comprises a plurality of openings therethrough and is disposed towards the interior of the reservoir tank, relative to the distal end of said oil seal annular projection.

* * * * *